United States Patent
Huang et al.

(10) Patent No.: US 8,403,111 B2
(45) Date of Patent: Mar. 26, 2013

(54) LUBRICANT APPLICATOR FOR GOLDEN FINGER INTERFACE

(75) Inventors: Er-Peng Huang, Shenzhen (CN); Yong-You Ming, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 849 days.

(21) Appl. No.: 12/567,807

(22) Filed: Sep. 28, 2009

(65) Prior Publication Data

US 2011/0011680 A1   Jan. 20, 2011

(30) Foreign Application Priority Data

Jul. 15, 2009   (CN) .......................... 2009 1 0304377

(51) Int. Cl.
   *F16N 7/00*   (2006.01)
(52) U.S. Cl. ...................................... 184/14.1
(58) Field of Classification Search ................. 184/14.1; 360/99.16, 31, 94, 51, 75; 15/104.92, 257.05, 15/257.076; 134/135, 196, 197
   See application file for complete search history.

(56) References Cited

U.S. PATENT DOCUMENTS

| | | | | |
|---|---|---|---|---|
| 4,169,427 A | * | 10/1979 | Crump et al. | 118/307 |
| 4,578,120 A | * | 3/1986 | Chiarella | 134/9 |
| 4,736,759 A | * | 4/1988 | Coberly et al. | 134/66 |
| 4,817,650 A | * | 4/1989 | Tilton | 134/76 |
| 5,559,650 A | * | 9/1996 | Repphun et al. | 360/99.16 |
| 5,996,596 A | * | 12/1999 | Smith et al. | 134/61 |
| 6,499,494 B2 | * | 12/2002 | Berghash et al. | 134/135 |
| 7,909,594 B2 | * | 3/2011 | Kock | 425/107 |
| 2009/0241997 A1 | * | 10/2009 | Tafoya | 134/34 |
| 2012/0180821 A1 | * | 7/2012 | Feldstein | 134/30 |

* cited by examiner

*Primary Examiner* — William E Dondero
*Assistant Examiner* — Robert T Reese
(74) *Attorney, Agent, or Firm* — Altis Law Group, Inc.

(57) ABSTRACT

A lubricant applicator includes a base, a plurality of elastic members, and a plate member. The base includes a hollow space for receiving lubricant. The elastic support member is mounted within the hollow space of the base. The plate member is received in the hollow space and supported by the elastic support member. The plate member comprises a first slot and a plurality of through openings formed in an upper surface thereof. The first slot is shaped to accommodate a golden finger interface.

10 Claims, 2 Drawing Sheets

LUBRICANT APPLICATOR FOR GOLDEN FINGER INTERFACE

BACKGROUND

1. Technical Field

The present disclosure relates to a lubricant applicator.

2. Description of Related Art

Computer components, housed in a case, such as video cards, RAM, and many others, utilize an interface unit known as golden fingers, inserted into a corresponding interface slot or other similar interface. To facilitate insertion of such golden finger interfaces, a predetermined amount of lubricant is frequently applied to the golden fingers.

While the lubricant can be applied to the golden fingers manually, it is difficult to precisely govern the amount of lubricant applied. Excess lubricant can damage the motherboard and other components, while insufficient lubricant can impair proper insertion of the interface.

Therefore, what is needed is a lubricant applicator that can apply a predetermined amount of lubricant to the golden fingers.

BRIEF DESCRIPTION OF THE DRAWINGS

The components in the drawings are not necessarily drawn to scale, the emphasis instead being placed upon clearly illustrating the principles of the lubricant applicator. Moreover, in the drawings, like reference numerals designate corresponding parts throughout the several views.

DETAILED DESCRIPTION

Figure 1:
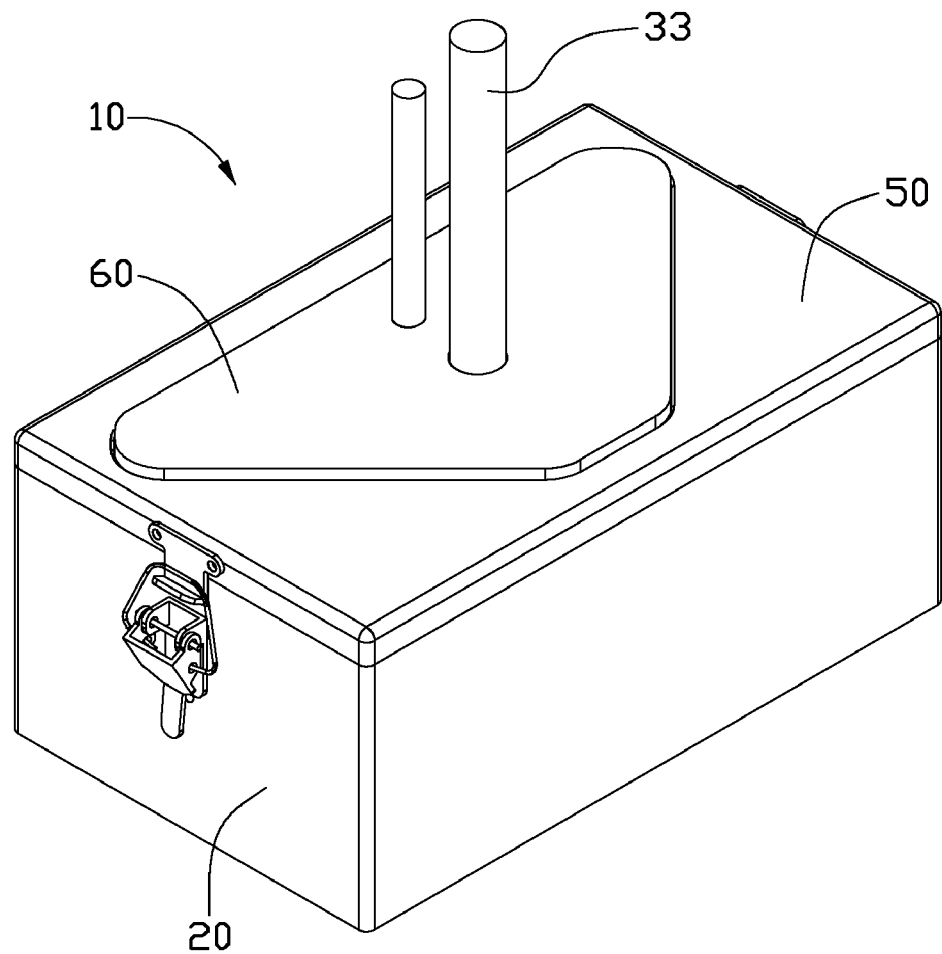
FIG. 1 is an isometric view of a lubricant applicator in accordance with an exemplary embodiment.
Figure 2:
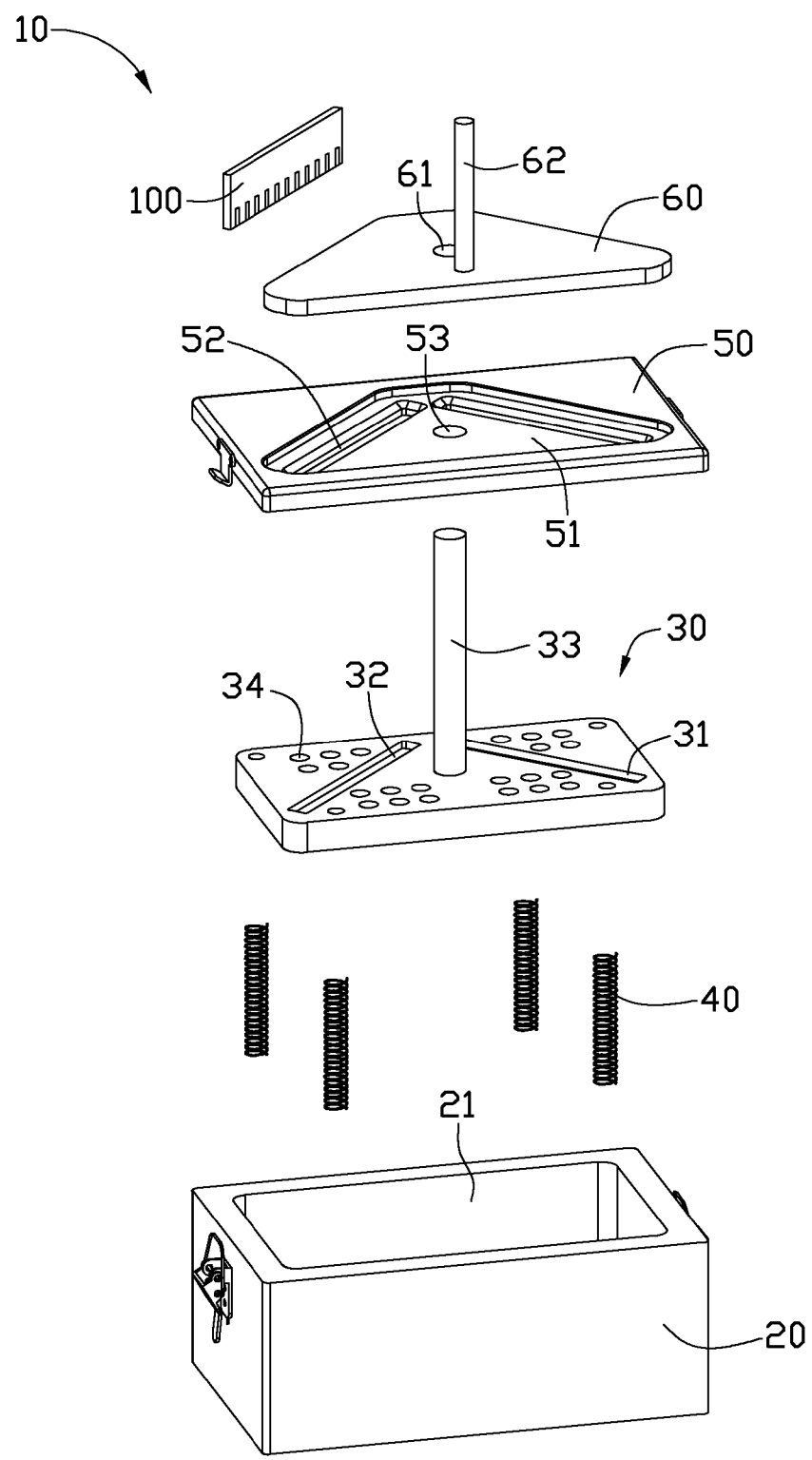
FIG. 2 is an exploded, isometric view of the lubricant applicator of FIG. 1.

Referring to FIGS. 1 and 2, a lubricant applicator 10 is provided for applying lubricant to a device 100 having a golden finger interface, such as a video card, RAM, or other.

The lubricant applicator 10 includes a base 20, a plate member 30, a plurality of elastic support members 40, a first cap 50, and a second cap 60. The base 20 includes a hollow space 21 for receiving lubricant.

The elastic members 40 may be coiled springs each having one end securely connected to the bottom surface of the hollow space 21. The plate member 30 is shaped to be slidably received in the hollow space 21 and supported by the elastic members 40. Upon receiving external force, the plate member 30 moves downwardly and the elastic members 40 are compressed. After the external force is removed, the plate member 30 recovers to its original position by the resilient force of the elastic members 40.

The plate member 30 includes a first slot 31 and a second slot 32 formed on an upper surface thereof. The first slot 31 and the second slot 32 are shaped to accommodate the golden finger interface of the device 100. The plate member 30 also includes a handle 33 for causing the plate member 30 to be moved downwardly.

In the exemplary embodiment, the plate member 30 further includes a plurality of through holes 34 disposed in the plate body thereof. When the plate member 30 moves downwardly to a predetermined position, lubricant stored in the hollow space 21 passes through the through holes 34 into the first slot 31 and the second slot 32.

In another embodiment, the plate member 30 may have a periphery smaller than that of the hollow space 21, such that a gap is formed between the plate member 30 and the side walls of the hollow space 21, through which the lubricant can pass into the first slot 31 and the second slot 32.

The first cap 50 is shaped to cover the hollow space 21 to prevent the lubricant from contamination. The first cap 50 includes a recessed cavity 51 shaped to accommodate the second cap 60. Two through slots 52 are formed in the bottom surface of the recessed cavity 51, each of which is positioned to be in correspondence with one of the first slot 31 and the second slot 32, such that the golden interface of the device 100 can be inserted through the slot 52 into the first slot 31 or the second slot 32.

The first cap 50 also includes a through opening 53 through which the handle 33 passes. The first cap 50 may be removably attached to the base 20 in any conventional manner. For example, the first cap 50 may include a hook and the base 20 may include a loop engaging with the hook to retain the first cap 50.

The second cap 60 includes a through opening 61 through which the handle 33 passes. The second cap 60 also includes a handle 62 allowing the plate member 30 to be moved downwardly. The second cap 60 is received in the cavity 51 and, when removed, exposes the slots 52 during application of lubricant to the golden finger interface.

During application of lubricant to the golden finger interface, the plate member 30 is moved downwardly via operating the handle 33 to allow the first slot 31 and the second slot 32 to receive lubricant. After the first slot 31 and second slot 32 are filled with lubricant, two devices 100 pass through the slots 52, causing the golden finger interfaces to be received in the first slot 31 and the second slot 32. Because the first slot 31 and the second slot 32 are designed according to the golden finger interface and filled with lubricant, each golden finger interface position in the first slot 31 or the second slot 32 receives a controlled amount of lubricant.

While one embodiment has been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A lubricant applicator for a golden finger interface, the applicator comprising:
   a base including a hollow space for receiving lubricant;
   an elastic support member mounted within the hollow space of the base; and
   a plate member slidably received in the hollow space and supported by the elastic support member, comprising an elongated blind slot and a plurality of through openings formed in a body thereof, the plate member being configured to move downwardly to a predetermined position, such that lubricant in the hollow space is able to pass through the through openings and enter the slot, wherein the slot has a width and a length respectively greater than a width of and a length of the golden finger interface, allowing the golden finger interface to move into and out of the slot, with some lubricant applied thereon.

2. The lubricant applicator according to claim 1, wherein the plate member further comprises a handle formed on an upper surface of the plate member.

3. The lubricant applicator according to claim 2, wherein the cap defines a through hole to let the handle pass through.

4. The lubricant applicator according to claim 3, wherein the cap further defines a through slot corresponding to the slot to let the golden finger interface pass through.

5. The lubricant applicator according to claim 1, wherein the elastic support member comprises at least one coil spring.

6. The lubricant applicator according to claim 1, further comprising a cap shaped to cover the hollow space of the base.

7. A lubricant applicator for a golden finger interface, the applicator comprising:
- a base including a hollow space for receiving lubricant;
- an elastic support member mounted within the hollow space of the base; and
- a plate member slidably received in the hollow space and supported by the elastic support member, comprising an elongated blind slot, wherein the plate member has a periphery smaller than that of the hollow space and is configured to move downwardly to a predetermined position, such that lubricant in the hollow space is able to pass through a gap between the plate member and the hollow space and enters the slot, the slot has a width and a length respectively greater than a width of and a length of the golden finger interface, allowing the golden finger interface to move into and out of the slot, with some lubricant applied thereon.

8. The lubricant applicator according to claim 7, wherein the plate member comprises a handle formed on an upper surface of the plate member.

9. The lubricant applicator according to claim 7, wherein the elastic support member comprises at least one coil spring.

10. The lubricant applicator according to claim 7, further comprising a cap shaped to cover the hollow space of the base.

* * * * *